Aug. 6, 1963   H. WEINER   3,099,933
OPTICAL TOY
Filed May 9, 1960
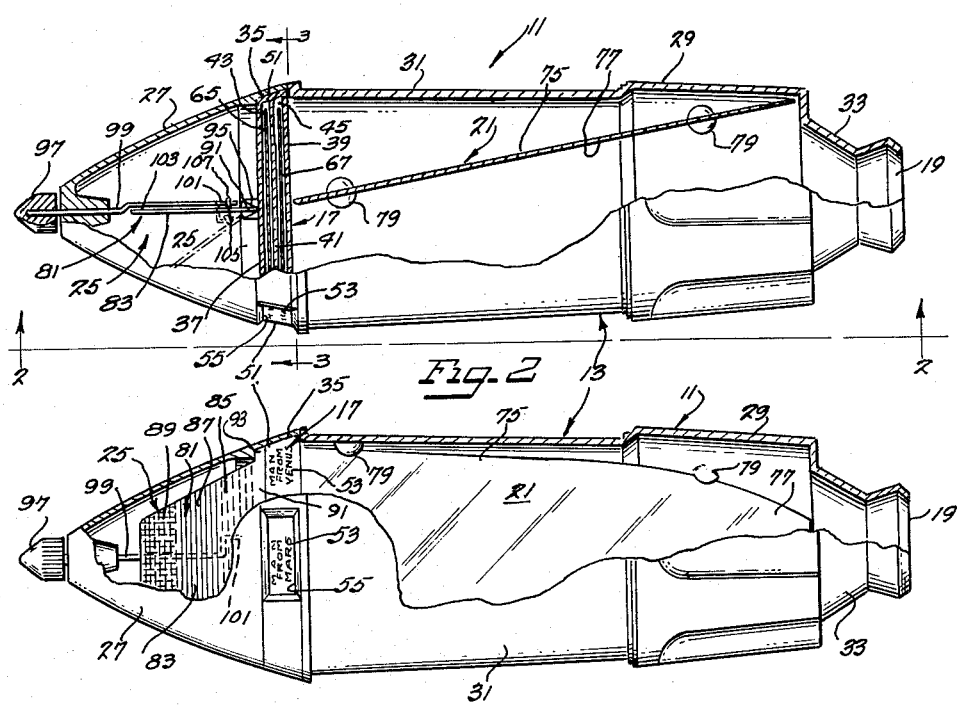
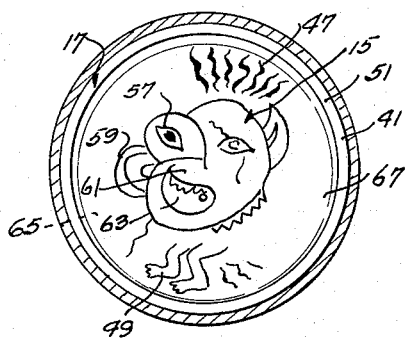
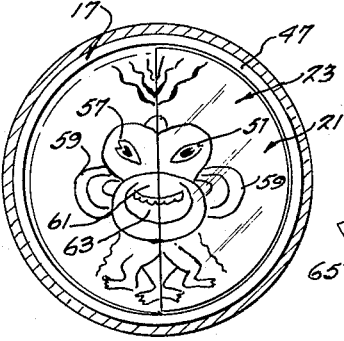
Inventor
HILMAN WEINER
By Soans, Anderson, Luedeka & Fitch
Attys

United States Patent Office 3,099,933
Patented Aug. 6, 1963

---

3,099,933
OPTICAL TOY
Hilman Weiner, Chicago, Ill., assignor to
Marvin I. Glass, Chicago, Ill.
Filed May 9, 1960, Ser. No. 27,953
3 Claims. (Cl. 88—15)

This invention relates generally to toy viewers, such as kaleidoscopes or the like. More particularly, the invention relates to and has for its principal object the provision of a viewer which produces a generally bilaterally symmetrical representation or picture. Another object of the invention is the provision of such a viewer which can be easily manipulated to present an infinite number of such pictures and/or to vary the coloring of the pictures. A still further object of the invention is the provision of a viewer of the type referred to above which resembles a space rocket and which incorporates a main image capable of presenting pictures which prompt a child to imagine fanciful creatures from other planets.

An additional object of the invention is the provision of a viewer which embodies various of the features mentioned above and which can be readily and economically manufactured. Other objects and advantages of the invention will become apparent by reference to the following description and the accompanying drawings of one embodiment of the invention in which:

FIGURE 1 is a side view, partially broken away and sectioned, of a viewer in accordance with the invention;

FIGURE 2 is a partially broken away and sectioned view taken along line 2—2 of FIGURE 1;

FIGURE 3 is a view taken along line 3—3 of FIGURE 1;

FIGURE 4 is a view similar to FIGURE 3 as seen through the viewer; and

FIGURES 5 and 6 are fragmentary views of additional images incorporated in the viewer.

Shown in the drawings is a viewer 11 which incorporates various of the features of the invention and which comprises a generally opaque housing 13, a main image 15 (see FIGURE 3) carried at one end of the housing by an element 17 which is rotatable so that the image 15 can be presented in various orientations, an opening 19 at the other end of the housing 13 through which the image 15 can be viewed, and a reflector 21 located in the housing 13 so as to hide or conceal approximately one-half of the image 15 and to reflect the other half so as to present through the opening 19 a bilaterally symmetrical picture or representation 23 (see FIGURE 4). If desired, one or more floating images can also be contained in the rotatable element 17 so as to provide a substantially inexhaustible variation in the picture which can be viewed. In addition, means 25 can be provided for variably coloring the pictures 23 so as to provide an even greater number of different visual effects which can be seen through the viewer.

Considering the construction of the various components in greater detail, the housing 13 can be easily fabricated to resemble a space rocket by bonding together two mating half sections. As shown, the housing includes a forward nose cone section 27 which is suitably joined, as by gluing, to an after section 29 comprising a generally cylindrical mid portion 31 and a tail portion 33 formed to incorporate a simulated afterburner which is apertured to provide the viewer opening 19. The nose cone section 27 is fabricated from a translucent plastic material to permit diffused entry of light into the housing 13, while the after section 29 is fabricated of opaque plastic material.

The rotatable element 17 which contains the image 15 is generally of truncated, conical formation and is located for rotation in a well 35 formed in the inner wall of the extreme forward part of the housing mid portion 31. The element 17, as shown, comprises two panes 37 and 39 of light transmitting, generally transparent material and an intermediate member 41 which carries the image 15 and which, together with the panes 37 and 39, defines two parallel chambers 43 and 45 in which additional images 47 and 49 are located (FIGURES 5 and 6 respectively). The panes 37 and 39 and intermediate member 41 are fixedly united by a circumferential band 51 to form the rotatable element 17. The band 51 carries on its outer surface a series of legends 53, one of which can be viewed at any particular setting of the element 17 through a slot or aperture 55 in the housing 13. In addition, the outer surface of the band 51 incorporates a series of irregularities which can be formed by the legends, so as to assist in dialing or rotating the element 17 through the slot 55.

The intermediate member 41, best seen in FIGURE 3, is also of light transmitting, generally transparent material, the image 15 carried thereon being a fanciful design which is adapted, when cut in half along any diameter and reflected, to provide a picture resembling a face, as seen in FIGURE 4, including, for instance, two eyes 57, ears 59 and a symmetrical nose 61 and mouth 63.

The chambers 43 and 45 respectively house the images 47 and 49 which are carried by light transmitting, generally transparent members 65 and 67. The members 65 and 67 are of circular shape having diameters less than that of the chambers 37 and 39 to facilitate floating movement therein while maintaining the members in generally concentric relation to the element 19. The images 47 and 49 are located along one portion of the periphery of the respective members 65 and 67 and are respectively designed to simulate hair or horns and legs. Thus, the floating images 47 and 49 are free to position themselves so as to variably locate the horns and legs with respect to the face of the image 15, thereby providing an infinite number of pictures or representations 23 which, to the imaginative child, could resemble men or animals from various planets.

If desired, the horn and leg images 47 and 49 could be carried on a single generally transparent member in predetermined relation to one another. Moreover, arms and hands could also be added on an additional image member or could be incorporated in a single image member containing both the horns and legs.

The reflector 21 constitutes a flat or planar piece 75 of stainless steel having a polished reflecting surface 77, although other reflecting materials can be used, and is properly located within the housing 13 by insertion of its edges into opposed pairs of slotted bosses 79 formed on the interior wall of the mid portion 31 of the housing. The reflector 21 is disposed transversely to the line of sight between the center of the opening 19 and the center line or axis of the rotatable element 17, terminating at its forward end along a line which passes perpendicularly through the axis of rotation of the rotatable element 17 and in adjacent relation to the transparent pane 39. Thus, the stainless steel piece 75 hides one-half of the image 15 and any porton of the other images 47 and 49 located therebehind. At the same time, the reflecting surface 77 is positioned to reflect the semi-circular portion of the image 15 or images 47 and 49 which are located on the other side of the line of sight.

If the reflecting surface 77 were located to conceal more or less than a half of the main image 15, various features of the invention could still be obtained as the resulting representation would be generally symmetrical, except that one portion of the resulting picture or representation 23 would be elongated with respect to the other.

Further fascination can be incorporated in the viewer 11 by incorporating means for variably coloring the representations presented. In this connection, the transparent nose cone section 27 includes a flat, trapezoidal aluminum plate or member 81 which is anodized on the surface 83 to provide a light reflecting capability and to provide a color pattern. While the aluminum plate 81 can be anodized in various color patterns, the reflecting surface 83 of the plate 81 includes a base band 85 of purple, an intermediate band 87 of red, and an outer band 89 of yellow.

Of course, if desired, a colored glass or other colored transparent material could be used in place of the aluminum plate and still obtain the variable color features of the invention.

At its base 91, the plate 81 includes a pair of ears 93 which extend from the boss and are located in V-shaped notches 95 formed in the inner wall of the nose cone section 27 to locate the base 91 along a line which passes perpendicularly through the axis of rotation of the element 17 and parallel to the forward end of the reflector 21. The plate 81 is retained in the notches 95 by engagement of its base 91 with the forward pane 37. Thus, the plate 81 is supported to permit pivoting about an axis along its base and between a central position in alignment with the line of sight extending from the center of the opening 19 to the center line or axis of the rotatable element 17 and a plurality of positions transverse to and on the other side of the line of sight with respect to the reflector 21.

Also provided in the nose cone section 27 is means for variably tilting the plate 81 to produce a selected color pattern in the picture produced by the viewer. This means includes a knob 97 at the forwardmost tip of the nose cone section 27 and a control rod 99 extending from the knob 97 inwardly of the nose cone section 27 in adjacent relation to the axis of the nose cone section. At its inner end, the control rod 99 is formed with a pair of right angle bends to provide an off-set leg 101 which is disposed between the nonreflecting side 103 of the plate 81 and a U-shaped bracket 105 secured thereto.

When the knob 97 is rotated, the off-set leg 101 swings outwardly relative to the axis of the nose cone section 27 to engage the side 103, thereby tilting the plate 81 out of its central position. When the knob 97 is subsequently turned in the other direction, the off-set leg 101 engages the web 107 of the U-shaped bracket 105 to return the plate 81 to its initial central position.

When in its center position, the plate 81 is not seen through the viewer and does not contribute any reflected light for forming the picture 23. However, as the plate 81 is tilted by operation of the knob 97, parallel color bands are first provided in the nonreflected portion of the viewed picture 23 in parallel and adjacent relation to the line bisecting the picture. As the angle of the plate 81 relative to the axis of the nose cone section is increased, the color bands will spread over a larger area of the nonreflected portion of the picture 23 and will also enter into the reflected portion. As the plate approaches a parallel relation to the pane 39, all of the reflected and nonreflected portions of the picture include parallel color bands which impart a rainbow-like appearance to the picture.

When in the presence of a suitable source of exterior light, a child can place the opening 19 to his eye in order to see the representation produced therein. By dialing the rotatable element 17 through the slot 55, the child can change at will the bilaterally symmetrical picture 23 which, to the child can be imagined as a creature inhabiting the planets of outer space. By turning the knob 97 to variably change the coloring of the picture 23, the fascinating attraction of the viewer is further intensified.

Various of the features of the invention are set forth in the appended claims.

What is claimed is:

1. A toy viewer comprising an open-ended opaque housing with one end thereof being adapted for viewing within said housing, a light transmitting element rotatably mounted within said housing at the other end thereof, said element including an outer generally circular band, a fixed image member fixedly mounted within the periphery of said band, at least one generally circular chamber adjacent said fixed image member, and a floating image member movably disposed within said chamber, said floating member being proportioned to substantially fill said chamber so as to slowly rotate relative to said fixed image as said element is rotated, said housing also having aperture means formed therein through which said band can be rotated, and a planar reflector located within said housing in transverse relation to the line of sight between said opening and said rotatable element, said reflector having one end terminating in adjacent relation to said rotatable element along a line passing perpendicularly through the rotational axis of said element, whereby various bilaterally symmetrical pictures can be presented to view through said opening incident to rotation of said element.

2. A toy viewer comprising an opaque housing having at one end thereof an opening for viewing within said housing, a light transmitting element rotatably mounted at the other end of said housing, said element including an image, a reflector located within said housing on one side of and in transverse relation to the line of sight between said opening and said rotatable element, said reflector having one end terminating in adjacent relation to said rotatable element along a line passing perpendicularly through the rotational axis of said element, whereby various bilaterally symmetrical pictures can be presented to view through said opening incident to rotation of said element, a colored reflecting surface carried by said housing on the other side of said rotatable element with one end thereof terminating adjacent said element along a line passing perpendicularly through the rotational axis of said element in parallel relation to said one end of said reflector, said colored reflecting surface being tiltable about said one end thereof, and means carried by said housing for tilting said colored reflecting surface between a position in alignment with said line of sight and a plurality of positions transverse to and on the other side of said line of sight with respect to said reflector, whereby the bilaterally symmetrical picture can be variably colored.

3. A toy viewer simulating a space rocket comprising a tubular housing having a forwardly located translucent nose section and an opaque after section including a mid portion and a tail portion having therein an opening for viewing within said housing, a light transmitting element rotatably mounted at the forward end of said mid portion, said element containing one fixed image and at least one floating image, a planar reflector located within said mid portion on one side of and in transverse relation to the line of sight between said opening and said rotatable element, said reflector having one end terminating in adjacent relation to said rotatable element along a line passing perpendicularly through the rotational axis of said element, whereby various bilaterally symmetrical pictures are presented to view through said opening incident to rotation of said element, a planar colored reflecting surface tiltably carried by said nose section with one end thereof terminating adjacent said element along a line passing perpendicularly through the rotational axis of said element in parallel relation to said one end of said reflector, and means carried by said nose section including a knob and a control rod engageable with the other side of said reflecting surface for tilting said colored reflecting surface between a position in alignment with said line of sight and a plurality of positions transverse to and on the other side of said line of sight with respect to said reflector, whereby the bilaterally symmetrical picture can be variably colored.

References Cited in the file of this patent

UNITED STATES PATENTS

| | | |
|---|---|---|
| 1,078,008 | Stough | Nov. 11, 1913 |
| 1,662,743 | Hanson | Mar. 13, 1928 |
| 2,381,801 | Bloxom | Aug. 7, 1945 |
| 2,484,116 | Papke | Oct. 11, 1949 |
| 2,493,237 | Eddy | Jan. 3, 1950 |
| 2,583,676 | Wendel | Jan. 29, 1952 |
| 2,959,094 | Kosma | Nov. 8, 1960 |